United States Patent
Laarakkers et al.

(10) Patent No.: US 9,602,649 B2
(45) Date of Patent: Mar. 21, 2017

(54) EVENT DISAMBIGUATION

(75) Inventors: Jeroen Laarakkers, Nootdorp (NL); Mattijs Oskar van Deventer, Leidschendam (NL); Victor Bastiaan Klos, The Hague (NL)

(73) Assignee: Nederlandse Organisatie voor toegepast-natuurwetenschappelijk onderzoek TNO (NL)

( * ) Notice: Subject to any disclaimer, the term of this patent is extended or adjusted under 35 U.S.C. 154(b) by 1283 days.

(21) Appl. No.: 13/386,461

(22) PCT Filed: Jul. 23, 2010

(86) PCT No.: PCT/NL2010/050478
§ 371 (c)(1),
(2), (4) Date: Apr. 9, 2012

(87) PCT Pub. No.: WO2011/010925
PCT Pub. Date: Jan. 27, 2011

(65) Prior Publication Data
US 2012/0184372 A1    Jul. 19, 2012

(30) Foreign Application Priority Data
Jul. 23, 2009 (EP) .................................... 09166191

(51) Int. Cl.
*A63F 13/31* (2014.01)
*G08B 3/10* (2006.01)
(Continued)

(52) U.S. Cl.
CPC ..... *H04M 1/7253* (2013.01); *H04M 1/72544* (2013.01); *A63F 13/31* (2014.09); *G08B 2001/085* (2013.01); *H04L 63/08* (2013.01)

(58) Field of Classification Search
CPC ........... H04M 1/72544; H04M 1/7253; H04M 2207/18; H04M 2242/30; H04M 2242/40;
(Continued)

(56) References Cited

U.S. PATENT DOCUMENTS 6,819,220 B1 * 11/2004 Lee ................... H04M 3/42382
340/573.1
2006/0282649 A1    12/2006 Malamud et al.

FOREIGN PATENT DOCUMENTS

| WO | WO 01/81885 | 11/2001 |
| WO | 2004/062131 | 7/2004 |
| WO | WO 2009/014438 | 1/2009 |

OTHER PUBLICATIONS

Extended European Search Report for Application No. 09166191.8, mailed Dec. 17, 2009.
(Continued)

*Primary Examiner* — Damon Pierce
(74) *Attorney, Agent, or Firm* — Patterson Intellectual Property Law PC

(57) ABSTRACT

A method of identifying at least two proximate devices (1, 2) comprises the steps of:—recording, in each device, an audio signal (AS) so as to produce respective audio samples, —detecting, in each device, a sensory identifier serving as a trigger (TR), —comparing the audio samples during a common interval (I) defined relative to the trigger (TR), and —deciding that the event is common to the devices only if the respective audio samples are sufficiently similar. The common interval (I) starts prior to the trigger (TR) and preferably also ends prior to the trigger.

26 Claims, 2 Drawing Sheets

Figure 1:
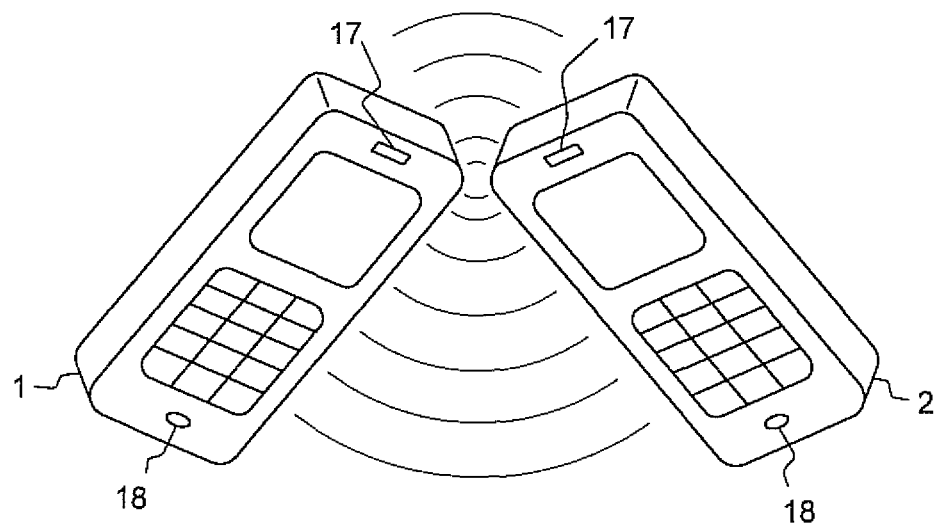

(51) Int. Cl.
*H04M 1/725* (2006.01)
*G08B 1/08* (2006.01)
*H04L 29/06* (2006.01)

(58) Field of Classification Search
CPC .. H04M 2250/02; H04L 63/08; A63F 13/217; A63F 13/31; A63F 13/327; A63F 13/34; A63F 13/215; A63F 13/424; A63F 13/44; A63F 2300/572; A63F 2300/6072; G08B 1/08; G08B 3/00; G08B 2001/085
See application file for complete search history.

(56) References Cited

OTHER PUBLICATIONS

PCT/NL2010/050478 International Search Report, mailing date Oct. 12, 2010.

\* cited by examiner

EVENT DISAMBIGUATION

The present invention relates to event disambiguation. More in particular, the present invention relates to a method of and a device for identifying proximate devices by using a sensory identifier, that is, to a method of and a device for pairing at least two devices if they are involved in a common event.

International Patent Application WO 2009/014438 (TNO/KPN) discloses a method of identifying proximate mobile devices by using sensory identifiers, that is, identifiers which can be perceived with the senses. Such a sensory identifier may for example be an audio identifier, such as a particular sound, or a video identifier, such as a particular image. The identifier serves to (uniquely) identify a common event, such as two mobile devices touching or two mobile devices registering the same symbol. However, even if an identifier is unique, it may be ambiguous when detected. The sound of two mobile devices being tapped together may be unique to those devices, but may be reflected and be detected again as an echo, or may be picked up by other mobile devices which were not involved in the tapping event. This may lead to identification errors, as some devices may detect a sensory identifier they are not proximate to, for example an echo of a touching event.

International Patent Application WO 01/81885 (Metravib) discloses a method and installation for detecting and locating a source of noises and vibrations in a pipe system. This known method relates to an entirely different field of technology: locating defects in pipes. In this known method, at least two sensors mounted on a pipe are separated by a known distance, which allows the location of a noise source to be determined. A triggering time may be followed by a period of noise signal analysis. The noise signal captured during this period may be transmitted to neighbouring sensors for intercorrelation in order to increase the sensitivity of the sensors. WO 01/81885 fails to suggest a solution for the problem of event disambiguation, in particular in the context of device pairing.

It is an object of the present invention to overcome these and other problems of the Prior Art and to provide a method of identifying proximate devices using a sensory identifier, in which method the chance of erroneous identifications is significantly reduced.

It is a further object of the present invention to provide a method of identifying proximate devices using a sensory identifier which can even be carried out without requiring the content of the sensory identifiers.

It is a still further object of the present invention to provide a device, preferably a mobile consumer device, as well as a system for carrying out the method of the present invention.

Accordingly, the present invention provides a method of identifying proximate devices, the method comprising the steps of:
  recording, in each device, an audio signal so as to produce respective audio samples,
  detecting, in each device, a sensory identifier,
  using said detecting as a trigger and using said sensory identifier for matching the devices,
  comparing the audio samples during a common interval defined relative to the trigger, and
  deciding that the devices are proximate only if the respective audio samples are sufficiently similar.

By detecting a sensory identifier, such as a sound or image, by each device concerned, a matching process can be started: all devices that detected the same sensory identifier are assumed to be proximate to each other. In addition, the detection of the sensory identifier is used as a trigger, creating a reference point in time. By comparing audio samples of substantially the same time interval it can be determined whether those audio samples match. If the audio samples match, that is, if they are sufficiently similar, it is decided that the event providing the sensory identifier is common to the devices: their "audio background" is (nearly) the same and proximity may be assumed. If the audio samples fail to match, that is, if they are too dissimilar, it is decided that the event providing the sensory identifier is not common to the devices and that the sensory identifier has led to a false detection. In case of an audio identifier, for example, erroneously detecting the audio identifier (that is, the sound) may be due to reflections off walls or ceilings.

It can therefore be seen that the invention substantially reduces or even eliminates false common proximity detections by taking the "audio background" of the devices into account. It will be understood that deciding that the devices are proximate, that is, that the devices are in the vicinity of each other, is only possible if the devices concerned have all detected matching representations of a sensory identifier. In other words, each device which detected a sensory identifier made a representation (i.e. a numerical code) of the detected sensory identifier, and the representations of the devices concerned were found to match, that is, to be identical or to be sufficiently similar. The representations may be exchanged between the devices, or between the devices and a server, to establish the match.

To determine whether audio samples are sufficiently similar, the audio samples (that is, the audio recordings) may be aligned (that is, they may be synchronised in time) and then their (dis)similarity may be determined using a suitable measure, for example the least squares method, and subsequently be compared with a threshold value. The threshold value may be predetermined but may also be dynamic, that is, adjusted according to the circumstances.

The method of the present invention can be used with two devices, but also with three or more devices, for example, four, five, eight, ten or even more. It is noted that the step of detecting a sensory identifier may comprise detecting the providing of a sensory identifier, and that a prior step of providing a sensory identifier may be included in some embodiments of the present invention.

It is possible to start recording the audio samples when the trigger is detected. In a preferred embodiment, however, the common interval starts prior to the trigger and preferably also ends prior to the trigger. That is, the audio sample is preferably pre-recorded, before the trigger is detected. This offers the advantage that the determination whether the audio samples match can be made sooner, as there is no need to wait for the recording to finish: the recording has already started and has preferably also finished before the trigger was detected.

The common interval may also overlap with the trigger, however, it is preferred that the common interval ends before the point in time at which the trigger occurs or, at least, is detected.

Advantageously, the method of the present invention may comprise the further step of comparing the audio samples during an additional common interval also defined relative to the trigger, wherein the additional common interval starts after the trigger. By using two time intervals, one before and one after the trigger, a more reliable determination of the "audio background" can be made, at the expense of a slightly longer recording and/or processing time.

In a preferred embodiment, the sensory identifier is part of the audio signal. That is, the sensory identifier is detected by analysing the audio signal and searching for a peak, trough, pattern, or other detectably signal property, which detection is then used as a trigger.

The audio samples may consist of series of digitised values of the audio signals. However, the amount of data to be stored and/or processed may be significantly reduced if the audio samples are represented by characteristic parameters. It is well known to reduce audio samples to sets of parameters, such as average amplitude, average frequency, bandwidth, and other parameters.

In a first embodiment, the step of comparing is carried out in a server. This requires the transmission of the audio samples to the server and the transmission of the matching results back to the mobile devices, but reduces the required amount of processing in the mobile devices. In a second embodiment, the step of comparing is carried out in at least one of the devices. It is possible for the comparing step to be carried out in both devices and then to exchange the results, which provides an extra check. However, the comparing step may also be carried out in a single device.

The step of using the sensory identifier for matching the devices may advantageously comprise exchanging messages between the devices, at least some of said messages containing a representation of the sensory identifier. In addition, the step of using the sensory identifier for matching the devices may advantageously comprise comparing representations of the sensory identifier and deciding that a match exists if the representations are sufficiently similar.

Accordingly, a first device may send a message containing a representation of the sensory identifier to a second device, which then compares its representation with the representation contained in the received message and sends an acknowledgement is a match is made. Alternatively, a first and a second device may each send a message containing their respective representation of the sensory identifier to a server, which compares the representations and sends an acknowledgement to each device if a match is made.

In a particularly preferred embodiment, the trigger is produced by tapping the two devices together. The sound of the two devices touching serves as a sensory (i.e. audio) identifier for identifying the tapping event.

The devices may be mobile consumer devices, for example mobile telephone devices, which are preferably arranged for playing games. However, the present invention is not limited to mobile devices and at least one of the devices may be stationary.

The present invention also provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

The present invention additionally provides a device for identifying proximate devices, the device comprising:
  a recording unit for recording an audio signal so as to produce respective audio samples,
  a detection unit for detecting a sensory identifier and for producing a trigger in response thereto,
  a matching unit for matching representations of sensory identifiers,
  a comparison unit for comparing the audio samples during a common interval defined relative to the trigger, and
  a decision unit for deciding that the devices are proximate only if the respective audio samples are sufficiently similar.

The device of the present invention has the same advantages as the method of the present invention. The device for identifying proximate devices may itself be one of the proximate devices, or may be a remote device such as a remote server.

In a preferred embodiment, the common interval starts prior to the trigger and preferably also ends prior to the trigger. Advantageously, the comparison unit may be further arranged for comparing the audio samples during an additional common interval also defined relative to the trigger, wherein the additional common interval starts after the trigger.

The device of the present invention may be a mobile consumer device, for example a mobile telephone device, and is preferably arranged for playing games. A suitable game is Living Stratego®, although the invention is not limited to this particular game. The present invention further provides a system for gaming comprising at least one device as defined above.

The present invention still further provides a server for carrying out the method of the present invention. Such a server is preferably arranged for receiving audio samples from devices and comprises a comparison unit for comparing the audio samples during a common interval defined relative to the trigger, and a decision unit for deciding that the event is common to the devices if the respective audio samples are sufficiently similar.

The present invention will further be explained below with reference to exemplary embodiments illustrated in the accompanying drawings, in which:

FIG. 1 schematically shows exemplary embodiments of portable consumer devices for use in the method of the present invention.

Figure 2:
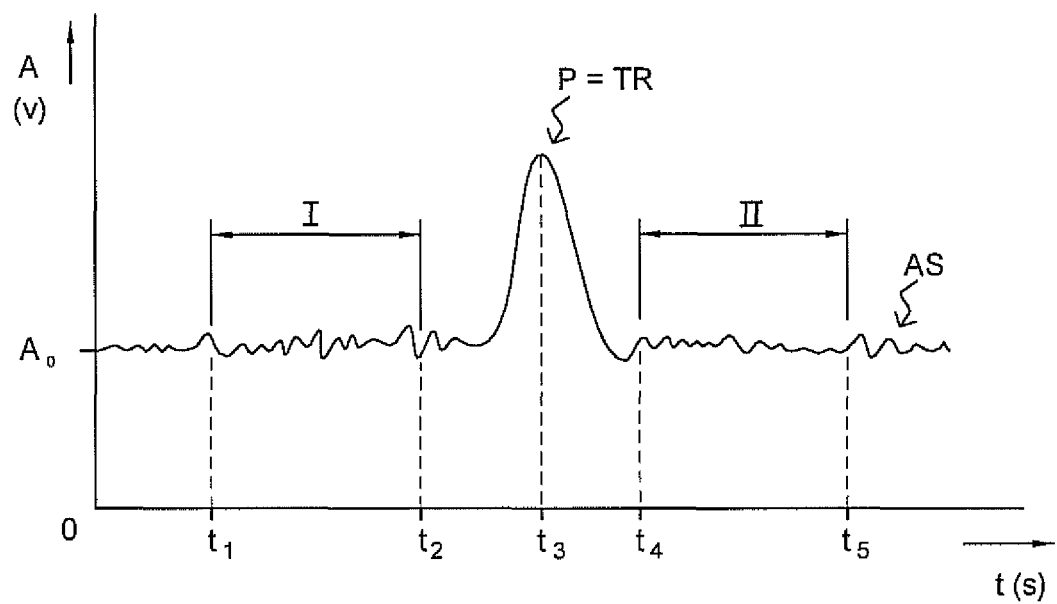

FIG. 2 schematically shows an exemplary audio signal and suitable time intervals as used in the present invention.

Figure 3:
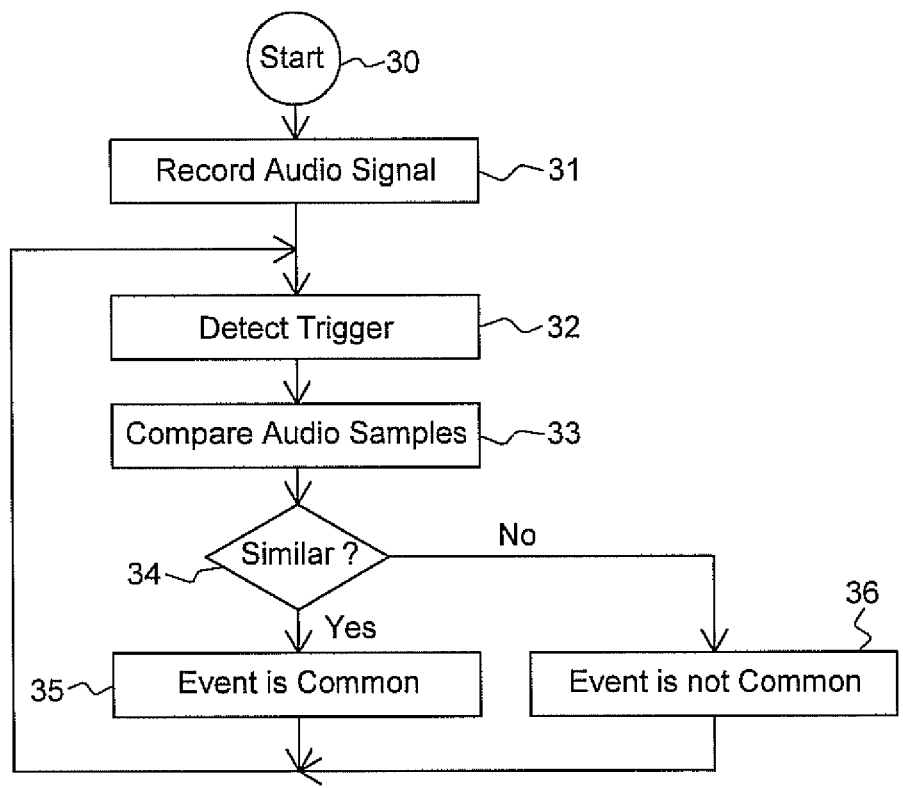

FIG. 3 schematically shows a flow diagram representing an embodiment of the method according to the present invention.

Figure 4:
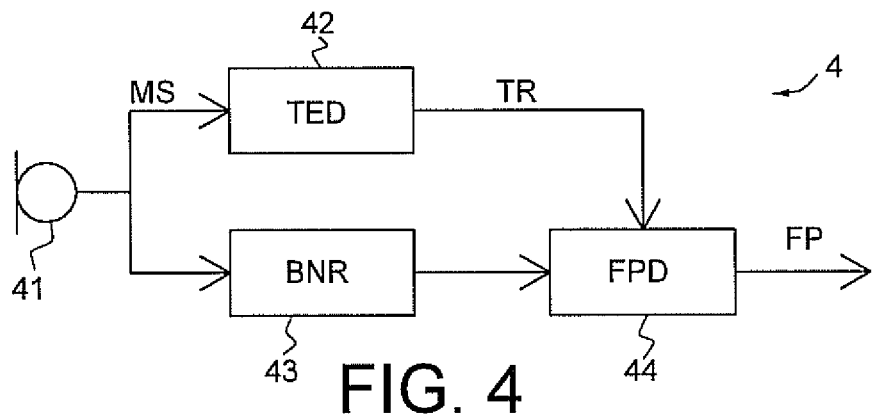

FIG. 4 schematically shows an embodiment of a audio fingerprint arrangement according to the present invention.

Figure 5:
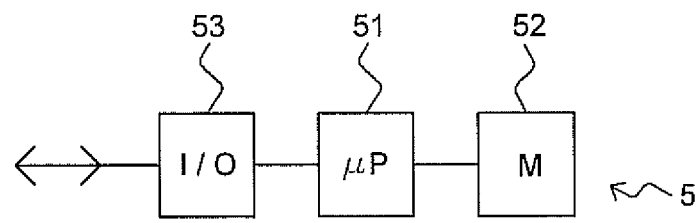

FIG. 5 schematically shows a microprocessor arrangement for use in the present invention.

The mobile telephone devices 1 and 2 shown merely by way of non-limiting example in FIG. 1 each comprise a loudspeaker 17 and a microphone 18. The mobile telephone devices 1 and 2 are examples of portable consumer devices which can be "matched" when they are in each other's proximity. This "matching" or "pairing", which may for example be achieved by tapping the devices together, may be used to exchange information between the devices. This information may comprise telephone numbers or other identification information, which in turn can be used to play games and/or engage in other activities. Thus, tapping the mobile telephone devices together may constitute an invitation to play a game or to share information. Reference is made to International Patent Application WO 2009/014438 mentioned above, which explains such pairing processes in more detail.

When the mobile telephone devices 1 and 2 are tapped together, the resulting tapping sound is received substantially simultaneously by the microphones 18 of both mobile devices. This tapping sound can be used as an identifier for identifying the pairing attempt: it is very likely that only devices which detect the tapping sound are involved in the encounter. It can thus be said that the tapping sound is an audio identifier, a special case of a sensory identifier: an identifier that can be perceived by the (human) senses. However, other identifiers may also be used for pairing, for example pressing buttons more or less simultaneously. The present invention is, however, primarily concerned with (but not limited to) audio identifiers.

The audio identifier may alternatively be constituted by a sound signal produced by a loudspeaker (e.g. a loudspeaker 17), the sound signal preferably consisting of multiple tones and/or pulses so as to be able to distinguish a plurality of different identifiers and/or time stamps. Such sound signals may in turn be produced in response to pressing a button.

When using sensory identifiers, in particular audio identifiers, for pairing or similar actions the problem of false matches arises. The microphones of the mobile devices may pick up reflections of the (tapping or other) sound off walls, and also sounds (or their reflections) made by other devices. In practice, therefore, the sound (or a similar identifier) is often not sufficient to properly identify the actual devices involved.

For this reason, the present invention proposes to use additional information for identifying the devices involved, and in particular, to use the "audio background" of the devices. To this end, the present invention proposes to receive and record an audio signal in both (or all) devices, and to compare the audio signals (or their representations). If the audio signals are sufficiently similar, the audio backgrounds (or acoustic backgrounds) of the devices match and it can be concluded that the devices were involved in the same encounter, in particular if the sensory identifiers also match. Accordingly, the matching of the audio signals can be used as a check of the matching of the sensory identifiers: if both the sensory identifiers and the audio signals match, the proximity of the devices is established with much greater certainty.

The (detection of the) audio identifier, such as the tapping sound, is in the present invention used as a trigger for triggering the comparison process. It is preferably also used as an identifier, for example by determining its properties (e.g. time of occurrence, amplitude and/or power, duration, etc.), for identifying the event which produced the audio identifier.

The inventive process of determining the audio background of a trigger is illustrated in FIG. 2, where the amplitude A of an audio signal AS is shown as a function of the time t. The audio signal AS may be received by the microphones 18 of the mobile telephone devices 1 and 2 of FIG. 1, but may also be received by a third device. The audio signal AS is recorded, that is, is received, stored and/or converted into a suitable representation (such as a digital representation after analogue/digital conversion, optionally followed by parameter extraction). The amplitude A, which may be measured in volts (V), is shown to have an initial average value $A_0$, while deviations from this value $A_0$ are mainly due to background noise. At $t_3$, the audio signal amplitude reaches a peak P, indicative of an audio identifier, such as the tapping together of two mobile telephone devices. The detection of the peak P triggers a comparison of the background noise during certain time intervals. For this reason, the peak P may be considered a trigger TR.

It is noted that a similar type of background matching may be carried out for video images, in particular when the sensory identifier is a visual identifier. A "video background" or "image background" may be matched to increase the reliability of matching on the basis of a visual identifier.

It is noted that audio backgrounds may also be used to enhance the reliability of visual identifiers.

In FIG. 2, two background noise measuring intervals are shown by way of non-limiting example. A first interval I extends from $t_1$ to $t_2$, and therefore both begins and ends before the occurrence of the trigger P, while a second interval II extends from $t_4$ to $t_5$ and therefore both begins and ends after the occurrence of the trigger P. Other intervals may be used (not shown) which may include the peak P. The audio signals AS, or their representations (that is, samples), recorded by both mobile telephone devices (1 and 2 in FIG. 1) are compared during at least one interval. If the audio signals of the two devices during the interval(s) are sufficiently similar, then it may be concluded that the devices share an acoustic background and that they are in each other's proximity. In other words, it may be concluded that the event causing the trigger (here: the peak P in the audio signal) was common to the devices.

It will be understood that the number of audio signals that may be compared is not limited to two, and that the audio signals from three, four or even more devices may be compared.

The audio signals may be compared in the first interval I, in the second interval II or in both. In a preferred embodiment of the present invention, the audio signals are only compared in the first interval I, prior to the trigger TR. This offers the advantage of being able to start comparing the signals immediately after the trigger, without having to wait for a suitable recording interval to finish. This embodiment requires the audio signal to be recorded prior to the trigger, a continuous recording is therefore preferred. It will be understood that continuous recording is not required when only interval II is used, since then the recording may be started by the trigger.

The length of the interval(s) may depend on the particular application and may be dynamically adjustable. In practice, the length of an interval may range from a few ms (milliseconds) to approximately one s (second). The preferred gap between $t_2$ (end of the first interval) and $t_3$ (trigger) may range from a few ms to a few hundred ms.

A preferred embodiment of the present invention is summarised in the flow diagram of FIG. 3. In step 30, the method starts. In step 31, the audio signal (AS in FIG. 2) is recorded, resulting in audio samples. As noted above, this recording may take place continuously as long as it may be necessary to identify events.

In step 32, a trigger is detected, such as an audio identifier (peak P in FIG. 2). This leads to step 33, in which audio samples are compared. The audio samples (or audio fragments) are stored audio signals or their representations. The audio samples may originate from two or more devices. In step 34, it is decided whether the audio samples are sufficiently similar. If they are, the event is common to the devices and a signal indicating this is produced in step 35, after which the routine returns to step 32 (or 31 if the audio signals are not recorded continuously). If the audio samples are not sufficiently similar, the event is not is common to the devices and a signal indicating this is produced in step 36, after which the routine also returns to step 32 (or 31 if the audio signals are not recorded continuously).

The extent of the similarity of the audio samples may be determined using a known method and criterion. For example, the audio samples may be aligned (in time), their mean values may be reduced to zero, and their absolute amplitudes may be established. Then the mean square error (MSE) may be determined using the difference of the absolute amplitudes. Subsequently, the resulting mean square error may be compared with a threshold value. This threshold value may be predetermined or may be adjusted dynamically.

With regard to the time intervals during which audio samples are compared, there are several possibilities, which each offer specific advantages.

In a first embodiment, the audio signals are only recorded during the time interval. In the example of FIG. 2, the recording may thus take place from $t_4$ to $t_5$, during time interval II. The start of this time interval, at $t_4$, may take place as soon as possible after the detection of the trigger. In this embodiment, therefore, the recording only takes place during the interval and then substantially the entire time interval is used in the comparison. This saves memory space but only allows time intervals after the trigger.

In a second embodiment, the audio signals are recorded virtually continuously and a section (that is, audio sample) of these recordings is used for the comparison (in some embodiments, more than one section may be used). In this embodiment, the time intervals correspond with the selected sections. This embodiment requires more memory space but allows audio samples recorded prior to the trigger to be used.

As stated above, the audio signals are represented by audio samples, which may be digitised audio fragments, or their representations, for example by characteristic parameters. Suitable parameters are average amplitude, time of occurrence, average frequency, bandwidth, and other parameters. By producing suitable characteristic parameters, a "fingerprint" of each audio signal can be made. This will further be explained with reference to FIG. 4.

The merely exemplary arrangement 4 of FIG. 4 comprises a microphone 41, a touch event detector (TED) 42, a background noise recorder (BNR) 43, and a fingerprint determination unit (FPD) 44. The arrangement 4 is designed for detecting "touch events", that is, events in which two (mobile) devices touch, for example when being tapped together so as to initiate a matching process.

The microphone 41 receives sound and produces a microphone signal MS (equivalent to the audio signal in FIG. 2), which is fed to both the touch event detector 42 and the background noise recorder 43. The touch event detector 42 detects a peak (P in FIG. 2) in the microphone signal, which peak is indicative of a touch event. The detection may be a simple threshold detection, or any other suitable detection. In response to the detection of the peak, the touch event detector 42 produces a trigger signal TR, which is fed to the fingerprint determination unit 44. Signal characteristics of the peak may additionally be used as an audio identifier for matching proximate devices.

The background noise recorder 43 records the microphone signal for the purpose of registering the background noise (or, more in general, background sound) and passes it on to the fingerprint determination unit 44. When triggered by the trigger signal TR, the unit 44 produces a fingerprint of the background noise signal by extracting suitable parameters of the signal. This fingerprint FP is then passed on to an event server or other suitable apparatus, such as the other of the two devices shown to be touching in FIG. 1. The communication with the server is preferably wireless, using an appropriate communication link (Bluetooth®, Ethernet, GMS, UMTS, GPRS, HSDPA, . . . ).

The arrangement of FIG. 4 may be implemented in hardware, in software, or in a combination of hardware and software.

The background noise or background sound constituting the "audio background" of the devices may, in part, be generated by one or all of the devices involved. At least one of the devices could, using its loudspeaker (17 in FIG. 1), produce an (audible and/or ultrasonic) audio signal in order to contribute to a common audio background. The audio signal could consist of a single tone, but could also comprise a certain sound pattern. The production of an audio signal by the devices could be substantially continuous, but could also be initiated by the trigger. When two or more devices produce an audio signal, they could do so either simultaneously or in turns. In the latter case the devices could be arranged for "listening" to other, similar devices and producing an audio signal in response to a detected audio signal.

An exemplary embodiment of a device for carrying out the method of the present invention is schematically illustrated in FIG. 5, where the device 5 is shown to comprise a microprocessor unit 51, a memory unit 52 and an input/output (I/O) unit 53. The memory unit 52 may comprise suitable software programs for making the microprocessor unit 51 carry out the steps of the present invention, such as detecting a trigger, comparing audio samples and/or deciding whether an event is common to the devices.

The device 5 of FIG. 5 may be a server, arranged for receiving the audio signals from a plurality of portable consumer devices, such as the mobile telephone devices shown in FIG. 1, a laptop computer, a PDA (personal digital assistant), or an MP4 player. Alternatively, the device 5 may be incorporated in a portable consumer device.

Although the present invention has been explained with reference to pairs (or triplets, or quadruplets) of mobile devices, it is not essential that all devices involved are mobile. The present invention can also be carried out with a mobile (or at least portable) device and a stationary device.

The present invention is based upon the insight that the acoustic background of an acoustic identifier may assist in reducing the number of false or erroneous detections of proximate devices, in particular by adding a check to the identification process. The present invention benefits from the further insight that determining the acoustic background in a time interval prior to the acoustic identifier shortens the detection time.

The sensory identifier (an identifier that is perceptible by the human senses) is detected from an audio sensing signal or a sensing signal for another type of sense such as touch (contact) sensing, image sensing, sensing that a button is pushed etc. The detections of the sensory identifiers of different devices may be performed independently for each of the devices, for example in each device, by detecting signal peaks, signal troughs or signal patterns. These detections are used for two purposes: to perform matching with sensory identifiers of other devices and as a trigger to select a time interval of audio samples at predetermined relative temporal position with respect to a time point of the detected sensory identifier.

When the matching of the detected sensory identifiers produces the identification of a pair or group of devices with matching sensory identifiers, a comparison between the audio samples of the devices is used, for the time intervals that were selected by the triggers of those devices. If the audio in these time intervals also matches, it is decided that the devices are proximate and actions are enabled that depend on this decision. As a result, different forms of comparison may be used for matching sensory identifiers and for comparing audio in the selected time intervals respectively. The comparison of audio in the selected time intervals can be performed without first detecting selected identifiers in the audio. A more time consuming type of comparison, using significantly more data, may be used for comparison of audio in the selected time intervals than for finding matching identifiers. A more robust type of comparison may be used that involves suppression of incidental differences such differences between the devices in amplitude sensitivity or distribution of spectral sensitivity.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A method of identifying proximate devices, the method comprising the steps of:
   recording, in each device, an audio signal so as to produce respective audio samples,
   detecting, in each device, a detected sensory identifier, and
   transmitting the respective audio samples from one or more of the devices to a server or another of the devices, wherein the server or device receiving the respective audio samples comprises a processor, a memory and software configured to perform the remaining steps of
   using said detected sensory identifier for matching the devices, using said detecting as a trigger to select a common time interval of audio samples at a predetermined relative temporal position offset with respect to a time point of the detected sensory identifier;
   comparing respective audio samples recorded during the common time interval by different ones of the devices with each other, and
   deciding that the devices are proximate only if the respective audio samples are sufficiently similar.

2. The method according to claim 1, wherein the common time interval starts prior to the time point of the detected sensory identifier.

3. The method according to claim 2, wherein the common time interval ends prior to the time point of the detected sensory identifier.

4. The method according to claim 1, comprising the further step of comparing the audio samples during an additional common time interval also defined relative to the time point of the detected sensory identifier, wherein the additional common time interval starts after the time point of the detected sensory identifier.

5. The method according to claim1, wherein the sensory identifier is part of the audio signal.

6. The method according to claim 1, wherein the audio samples are represented by characteristic parameters.

7. The method according to claim 1, wherein the step of comparing the audio samples is carried out in a server.

8. The method according to claim 1, wherein the step of comparing the audio samples is carried out in at least one of the devices.

9. The method according to claim 1, wherein the step of using said sensory identifier for matching the devices comprises exchanging messages between the devices, at least some of said messages containing a representation of the sensory identifier.

10. The method according to claim 9, wherein the step of using said sensory identifier for matching the devices comprises comparing representations of the sensory identifier and deciding that a match exists if the representations are sufficiently similar.

11. The method according to claim 1, wherein the sensory identifier is produced by tapping the devices together.

12. The method according to claim 1, wherein the devices are mobile consumer devices, for example mobile telephone devices.

13. The method according to claim 12, wherein the devices are arranged for playing games.

14. The method of claim 1, comprising
   using the detected sensory identifiers detected in the devices to pair the devices;
   using said comparing of the respective audio samples recorded by different ones of the devices as a check of a match of the sensory identifiers.

15. The method of claim 1, comprising
   each device which detected the sensory identifier making a representation of the detected sensory identifier,
   determining whether the representations of the detected sensory identifier made by the devices match;
   using said comparing of the respective audio samples recorded by different ones of the devices as a check of the match of the sensory identifiers.

16. The method of claim 1, comprising using said deciding to enable an exchange of information between the devices.

17. A tangible computer readable medium comprising a computer program for identifying proximate devices, by means of the steps of
   recording, in each device, an audio signal so as to produce respective audio samples,
   detecting, in each device, a detected sensory identifier,
   using said detected sensory identifier for matching the devices, using said detecting as a trigger to select a common time interval of audio samples at a predetermined relative temporal position offset with respect to a time point of the detected sensory identifier;
   comparing respective audio samples recorded during the common time interval by different ones of the devices with each other, and
   deciding that the devices are proximate only if the respective audio samples are sufficiently similar,
   wherein a processor, a memory and a computer software are configured in one or more of the devices or in a server to perform the matching, comparing and deciding steps.

18. A device for identifying proximate devices, the device comprising:
   a recording unit for recording an audio signal so as to produce respective audio samples,
   a detection unit for detecting a detected sensory identifier and for using said detecting as a trigger to select a common time interval of audio samples at a predetermined relative temporal position offset with respect to a time point of the detected sensory identifier,
   a matching unit for matching representations of the detected sensory identifiers detected by the devices,
   a comparison unit for comparing the audio samples recorded during the a common time interval by different ones of the devices with each other, and
   a decision unit for deciding that the devices are proximate only if the respective audio samples are sufficiently similar.

19. The device according to claim 18, wherein the comparison unit is arranged such that the common time interval starts prior to the time point of the detected sensory identifier.

20. The device according to claim 18, wherein the comparison unit is further arranged for comparing the audio samples during an additional common time interval which starts after the time point of the detected sensory identifier.

21. The device according to claim 18, further arranged for producing an audio signal, preferably in response to detecting of the sensory identifier.

22. The device according to claim 21, wherein the audio signal produced is at least in part ultrasonic.

23. The device according to claim 18, which is a mobile consumer device, for example a mobile telephone device.

24. The device according to claim 23, which device is arranged for playing games.

25. The device of claim 18, wherein the matching unit is configured to use said deciding as a check of a match of the sensory identifiers.

26. The device of claim 18, wherein said decision unit is configured to enable an exchange of information between the devices if the respective audio samples are sufficiently similar.

* * * * *